United States Patent [19]
Nelson et al.

[11] Patent Number: 5,597,891
[45] Date of Patent: Jan. 28, 1997

[54] PROCESS FOR PRODUCING POLYESTER ARTICLES HAVING LOW ACETALDEHYDE CONTENT

[75] Inventors: Gregory W. Nelson; Clinton Cherry; Eric G. Olsen, all of Kingsport, Tenn.

[73] Assignee: Eastman Chemical Company, Kingsport, Tenn.

[21] Appl. No.: 624,028

[22] Filed: Aug. 1, 1995

[51] Int. Cl.$^6$ ............................... C08F 6/00; B29C 47/38
[52] U.S. Cl. .................. 528/481; 528/272; 528/307; 528/308.1; 528/308.6; 528/483; 528/502; 528/503; 264/101; 264/176.1; 264/211.21; 264/211.24
[58] Field of Search ..................... 528/272, 307, 528/308.1, 308.6, 481, 483, 502, 503; 264/101, 176.1, 211.21, 211.24

[56] References Cited

U.S. PATENT DOCUMENTS

| | | | |
|---|---|---|---|
| 3,619,145 | 11/1971 | Crawford et al. | 422/134 |
| 4,064,112 | 12/1977 | Rothe et al. | 528/272 |
| 4,107,787 | 8/1978 | Ocker | 366/75 |
| 4,142,040 | 2/1979 | Jabarin et al. | 528/502 |
| 4,230,819 | 10/1980 | Hauenstein et al. | 528/483 |
| 4,255,295 | 3/1981 | Regnault et al. | 521/48 |
| 4,263,425 | 4/1981 | Rothe et al. | 528/309 |
| 4,362,852 | 12/1982 | Pendlebury et al. | 525/437 |
| 4,591,629 | 5/1986 | El-Ghatta et al. | 528/308.2 |
| 4,980,105 | 12/1990 | Schmidt et al. | 264/101 |
| 5,102,594 | 4/1992 | Burlet et al. | 264/101 |

OTHER PUBLICATIONS

M. H. Mack, Plastics Engineering, pp. 47–51, Jul. 1986.
J. A. Biesenberger and G. Kessidis, Polymer Engineering Science, vol. 22, No. 13, pp. 832–836, Sep. 1982.
J. A. Biesenberger and D. H. Sebastian, Principles of Polymerization Engineering, Krieger Publishing Company, Chapter 6, Malabar, Florida, 1983.
Japanese Kokai Patent Application No. Sho 53[1978]–71162.

*Primary Examiner*—Samuel A. Acquah
*Attorney, Agent, or Firm*—Karen A. Harding; Harry J. Gwinnell

[57] ABSTRACT

Disclosed is a process for removing acetaldehyde from polyester which comprises the steps of a) transporting molten polyester to a vented, continuous screw conveyor having a polymer compression zone, b) rotating the screw of said conveyor so as to compress and convey through the extruder the molten polymer for a time of less than 15 minutes and at a temperature of less than 300° C., c) simultaneously with step b), flowing a purge agent into and out of said extruder to thereby remove volatile impurities and avoid appreciable build-up of acetaldehyde, and d) conveying the devolatized polymer melt to a mold wherein an article of manufacture is formed.

13 Claims, 1 Drawing Sheet

PROCESS FOR PRODUCING POLYESTER ARTICLES HAVING LOW ACETALDEHYDE CONTENT

TECHNICAL FIELD

The present invention relates to a process for producing polyester articles having low acetaldehyde content wherein the conventional solid state polycondensation step is not required. The steps of the present invention include polymerization in the melt, melt devolatilization by a purging agent, and forming into useful articles.

BACKGROUND OF THE INVENTION

This invention is especially useful with respect to poly(ethylene terephthalate) (PET) which is widely used in the food-packaging industry. Worldwide usage for beverage bottles alone amounts to well over one billion pounds annually.

When PET is used to package foods and beverages, the presence of acetaldehyde in the polymer above certain concentration levels (above approximately 10 ppm) imparts undesirable flavors to the packaged food and beverages. This problem is eliminated successfully in the conventional method of producing high molecular weight PET, which involves the melt-phase polymerization of either dimethyl terephthalate (DMT) or terephthalic acid (TPA) with ethylene glycol to produce PET with an inherent viscosity (I.V.) of about 0.6, conversion of the molten PET to pellets, and solid-state polymerizing these pellets at temperatures of approximately 190°–230° C. for approximately 4–16 hours to produce PET of the required I.V. for food-packaging use. This latter step of heating the PET pellets under controlled conditions is an additional polymerization step and is referred to as solid stating. It is a fortunate feature of this solid state polymerization that it removes most of the acetaldehyde from the PET, as it is a characteristic of the PET polymer pellets produced by conventional melt-phase polymerization and pelletization that it contain relatively high levels of acetaldehyde.

The solid stating process, while effective, is both time-consuming and costly, and it would obviously be desirable to eliminate it. The subject invention provides a process for acetaldehyde reduction in molten polymer without the need for solid-state acetaldehyde removal processes. Savings in time and cost should be significant. Furthermore, the invention provides an improved method for removing acetaldehyde from molten PET which might be obtained from remelting pellets which have an undesirable level of acetaldehyde, or for removing acetaldehyde generated in the solid polymer remelting process.

Melt phase ventilation is known and practiced for devolatilization of polymer and polyester melts. Examples exist which show that vacuum devolatilization reduces the acetaldehyde levels in molten polyester. However vacuum systems are often difficult to operate and maintain at the necessary high vacuum levels needed for acetaldehyde devolatilization. Furthermore, air-leak free operation of vacuum vented extruders is often difficult.

Using the process described in this current invention, polyesters with the proper I.V. and desirably low levels of acetaldehyde can be provided without the need for acetaldehyde removal in the solid state.

Typically, acetaldehyde is removed from polyesters in the solid phase. For example, U.S. Pat. No. 4,263,425 describes a solid state process for eliminating acetaldehyde from polyester chips. The author acknowledges that acetaldehyde can be partially eliminated from a polyester melt using vacuum, but states that tolerable levels cannot be achieved. Furthermore, he states that such a process would not be desirable seeing that elimination of acetaldehyde from a polyester melt at higher viscosities is even more difficult. Therefore, the author states that it is necessary to eliminate acetaldehyde in the solid state for acceptable food packaging products.

U.S. Pat. No. 4,064,112 describes a method for overcoming sticking problems during the solid stating process. It discusses the disadvantages of a solely melt phase process and states that "elevated concentrations of acetaldehyde are to be expected in the melt".

U.S. Pat. No. 5,102,594 describes the crystallization of solid PET in a vented extruder under vacuum to reduce acetaldehyde content and build up the molecular weight of the polymer. The devolatilized solid polymer is immediately melted and extruded directly into a final product.

U.S. Pat. No. 4,591,629 describes a process for continuous production of high molecular weight polyesters in a two-stage process for treating polyester in the solid phase in which (1) in a first stage the polyester is treated with steam or a purging agent or air containing steam at a temperature of 100°–245° C. and (2) in a second stage it is post-condensed at 200°–245° C. with a purging agent and/or air at normal pressure or under vacuum. The process is said to be especially useful for the production of high molecular weight PET having a total content of dissolved and bound acetaldehyde of less than 3 ppm. This PET is said to especially useful for the production of bottles and other containers for foodstuffs.

Using extruders to devolatilize polymer melt streams is known in the literature. For instance, Mack [M. H. Mack, Plastics Engineering, pp 47–51 (July 1986)] discusses some selection criteria for a variety of melt devolatilization applications. For single screw extruders, Mack's work shows devolatilization to the range of 5 ppm residual ethylene in low viscosity ethylene/vinyl acetate copolymers. In higher viscosity polymers, 15 ppm levels were all that was achievable. Biesenberger, et al., has published both theoretical and experimental data on devolatilization of styrene from polystyrene melts in single screw vented extruders under vacuum and purging agent blankets, as well as other examples. For instance, Biesenberger's data and examples show residual styrene monomer reducing from over 5000 ppm to approximately 100 ppm after devolatilization. Biesenberger compares vacuum venting and nitrogen purge venting at atmospheric pressure and concludes that vacuum venting is more efficient than agent purging for removing volatiles from polymer melts. See J. A. Biesenberger and G. Kessidis, Polymer Engineering Science, 22, 13, pp 832–836 (1982) and J. A. Biesenberger and D. H. Sebastian, Principles of Polymerization Engineering, Krieger Publishing Company, Chapter 6 (Malabar, Fla., 1983).

Prior patent art teaches that vacuum devolatilization is a viable way to reduce or remove volatiles from a molten polymer. For example, U.S. Pat. No. 4,362,852 describes a process for devolatilizing molten polyester and polyamide with a rotary disk processor operating under vacuum. The process is stated to lower residual monomers in polyamides to 2.5 weight percent. The process is also stated to lower ethylene carbonate and carbon dioxide in polyesters to levels of 100 ppm and 50 ppm, respectively.

U.S. Pat. No. 4,980,105 provides an example of an extruder process for devolatilizing a polymer melt to remove by-products. In this case, a by-product was formed in an earlier reaction step and remains in the polymer. Extruder devolatilization using vacuum venting removed this by-product. However, devolatilization of acetaldehyde is substantially different from this example since acetaldehyde is a continuously produced by-product in molten polyesters.

Japanese Kokai Patent Application No. Sho 53[1978] 71162 describes a method of melt processing polyester and lowering acetaldehyde content by holding remolten PET at pressures less than 250 mm Hg for at least 5 seconds and then under ordinary pressure or increased pressure for less than 5 minutes. Cited examples in this process demonstrate that the removal efficiency of acetaldehyde increases as the vacuum pressure is lowered in an extruder port. The authors state that at pressures above 250 torr and at long venting times, acetaldehyde is difficult to remove from polyesters.

U.S. Pat. No. 4,230,819 describes the removal of acetaldehyde from crystalline PET with a dry agent (air or nitrogen at 170°–250° C.). It states that acetaldehyde cannot be completely removed from PET by heating it under pressure.

U.S. Pat. No. 4,255,295 describes a process for production of a polymer of good spinnability from waste. It consists of compressing the finely-chopped waste by means of a screw until a bulk density of 500 kg/m$^3$ is reached, introducing same into a double-screw degassing extruder where it is melted, and subjecting the molten polymer to a post-condensation operation under reduced pressure. During the melting of the polymer and the post-condensation operation, traces of water and volatile impurities are removed. The polymer is said to be suitable for use in spinning operations and in plastics, but only nonwoven webs are cited.

U.S. Pat. No. 4,142,040 discloses a method of processing in the molten state a saturated polyester resin so as to minimize degradation to yield acetaldehyde. This patent discloses in column 4, lines 38 et seq., "inert gas—is introduced through one or more conduits 3 into the bottom of the hopper or through one or more conduits 3a into the feeding zone (or both). The inert gas flushes essentially all air from the polyester as it advances through the initial part of the feeding zone."

DESCRIPTION OF THE INVENTION

Figure 1:
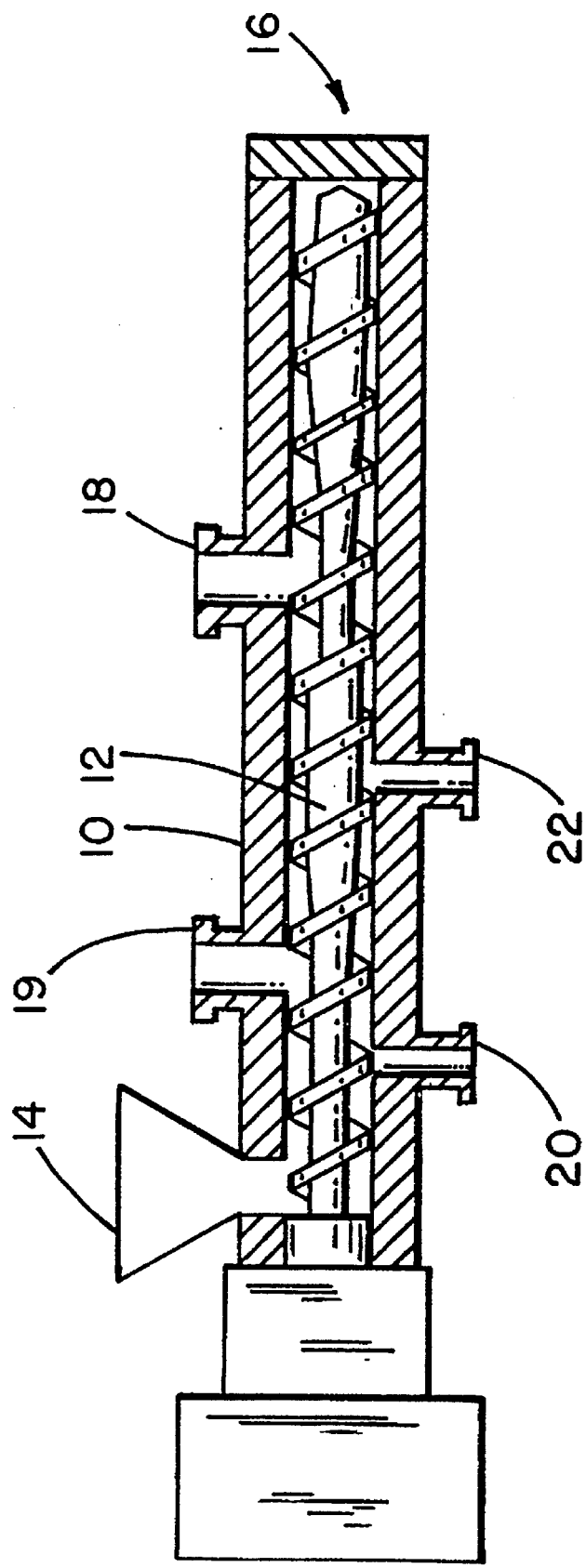
FIG. 1 is a schematic diagram illustrating a vented extruder which may be used in the process of the present invention.

According to the present invention, a process is provided for removing acetaldehyde from polyester which comprises the steps of a) transporting molten polyester to a ported, continuous screw conveyor having a polymer compression zone, b) rotating the screw of the conveyor so as to compress and convey through the extruder the molten polymer for a time of less than 15 minutes and at a temperature of less than 300° C., c) simultaneously with step b), flowing a purge agent into and out of said extruder to thereby remove volatile impurities and avoid appreciable build-up of acetaldehyde, and d) conveying the devolatized polymer melt to a forming device wherein an article of manufacture is formed.

Polymers that are particularly useful in this process include poly(ethylene terephthalate), poly(ethylene naphthalenedicarboxylate), and copolyesters containing up to about 50 mol % of modifying dibasic acids and/or glycols. Modifying dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like.

Highly useful naphthalenedicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 1,8-isomers may also be used. The dibasic acids may be used in acid form or as their esters such as the dimethyl esters for example.

Typical modifying glycols may contain from about 3 to about 10 carbon atoms and include propylene glycol, 1,3-propanediol, 1,4-butanediol, 1,6-hexanediol, diethylene glycol, 1,4-cyclohexanediol, 1,4-cyclohexanedimethanol, and the like. The 1,4-cyclohexanedimethanol may be in the cis or the trans form or as cis/trans mixtures.

The polyesters of this invention are readily prepared using polycondensation reaction conditions well known in the art. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present. Although we prefer to use continuous polycondensation reactors, batch reactors operated in series may also be used.

Although we prefer to use the polyesters in this process in an unmodified form, other components such as nucleating agents, branching agents, colorants, pigments, fillers, antioxidants, ultraviolet light and heat stabilizers, impact modifiers and the like may be used if desired.

Following preparation of the polyester in the melt phase to an I.V. of 0.50–0.85 dL/g as described above, preferably the polyester melt is passed through a suitable filter to remove impurities, gels, etc. Filtering of polymer is well known in the art and may be accomplished by passing it through a wire mesh filter, for example.

The filtered polyester next enters a devolatilization device, e.g., an extruder having vents or ports, an example of which is illustrated in FIG. 1. The extruder includes ports for entrance of a purge agent and a port for removal of volatiles such as acetaldehyde. The purge agent may be any of those known in the art such as an inert gas, reactive scavenger, etc. Nitrogen is preferred.

Either a single or twin-screw extruder may be used. The single screw illustrated in FIG. 1 includes barrel 10, having screw 12 contained therein for rotation, thereby feeding polymer pellets from feed hopper 14 down the length of the barrel where they are melted, degassed and finally extruded from the end at 16. Port 18 is optionally connected to a controlled pressure source. A purge agent is used to remove volatiles. The purging agent may enter the barrel at or near hopper 14, such as ports 19 or 20, or farther downstream, such as ports 18 or 22. Obviously, the flow direction of the purge agent with respect to the polymer many be manipulated by techniques well known in the art, such as concurrent or countercurrent and may be injected above the surface or subsurface to the polymer. The purge agent may enter and leave by the same port or different ports. Preferably the purging agent is an inert gas.

In the case of a high performance final polymerization reactor, a combination of equipment design, production rates, and operating conditions can facilitate increasing the molecular weight of the polyester and devolatilizing acetaldehyde in the same piece of equipment. In this advantageous embodiment, the polymer is rapidly pelletized via a gear pump linked directly to the exit of the reactor.

Vented single-screw or twin-screw extruders may be employed, with twin-screw extruders generally being preferred by reason of their particular suitability for devolatilization. Such twin-screw extruders may be of the corotating or counterrotating type, with either intermeshing or nonintermeshing screws. Hereinafter, particular reference will be made to corotating, intermeshing extruders which are often especially useful for this purpose. Typical useful extruders are described in U.S. Pat. Nos. 4,107,787 and 3,619,145, incorporated herein by reference.

In order to suppress thermal degradation of the polyester, it is preferred that extrusion be performed under conditions of low viscous dissipation; that is, with minimization of heat generation by friction as a result of shearing. Two sources of heat are normally present in extrusion operations: external application and friction. It is, of course, necessary that some heat be provided in order to melt the resin and facilitate devolatilization with minimum residence time. For the most part, temperatures up to about 330° C. may be employed, preferably not over 300° C. for extended periods of time. However, viscous dissipation should be minimized by designing the extruder screws(s) to maintain the temperature of the polymer being extruded at no point more than about 15° C. greater than the barrel temperature of the extruder as the result of externally applied heat.

A low residence time of the polyester in the extruder is also preferred. Preferred residence times are not accurately expressed as absolute values, since there is great variation based on such factors as the size of the extruder, its screw speed, and the viscosity of the polyester being extruded. For the purposes of the present invention, residence time may be minimized by employing predominantly forward-conveying screw elements having a relatively high pitch, typically 45° (all pitches being angles from a plane perpendicular to the screw length), and by minimizing the size of non-forward-feeding elements such as reverse-feed elements and neutral kneading blocks.

By "continuous" screw conveyor, we mean a screw conveyor such as shown in FIG. 1 wherein the screw elements are uninterrupted.

The melted polyester passes into a vented devolatilizing stage in the extruder. It is in this stage that volatiles including acetaldehyde are removed by purging agent. Such removal is facilitated by maintaining high and frequently renewed surface area of the resin and relatively high resin temperature, typically in the range of about 250°–300° C. The length of this stage is usually about 25–75% of total system length. As in the melting stage, screw elements of high pitch are employed in the devolatilizing stage; as a result of the upstream seal, the proportion of resin moving into this stage is relatively small and the screw channels are not entirely filled, which aids in preserving high surface area for efficient devolatilization. At the extreme downstream end of the devolatilization stage, lit may again be preferred to reduce the screw pitch in preparation for a second liquid seal, which prevents back pressure from the extruder die which would cause melted polyester to back up into the previous stage, inhibiting devolatilization. This seal is often conveniently created by means of a single forward-flighted kneading block of relatively low screw pitch.

Under ideal conditions, the polyester would immediately exit the extruder die after the second liquid seal. However, it may be preferred to employ a metering stage of medium pitch, typically in the range of about 30°–35°, to create pressure to force the polyester through the die.

The method of this invention is illustrated by an example in which there was employed a Werner-Pfleiderer corotating, intermeshing twin screw extruder with a screw diameter of 28 mm and a length of 775 mm. The stages in the extruder are designed as follows, all screw elements being forward-conveying (i.e., right-hand pitch):

Pre-feed seal—15° screw, 15 mm

Solids feed stage—45° solids conveying screw, 135 mm; 45° transition screw, 15 mm Melting stage—45° screw, 195 mm; 15° screw, 15 mm First liquid seal—forward-conveying kneading block, 15 mm; neutral kneading block, 30 mm Devolatilizing stage—30° screw, 30 mm; 45° screw, 150 mm Second liquid seal—forward—flighted kneading block, 15 mm Metering stage—30 screw, 160 mm The extruder is charged with PET having an I.V. of 0.72. It is operated at a screw speed of 300 rpm and a resin feed rate of 4.7 kg/hr., with the port being maintained at ambient pressure, using a nitrogen sweep of 35 standard cubic feet per hour. The extruder is divided into four heating zones as follows:

Water-cooled—105 mm

Heated at 115° C.—120 mm

Heated at 274° C. (resin temperature up to 286° C.—480 mm

Heated at 300° C.—70 mm

The vented section of the extruder should be constructed such that no flow of ambient gases, such as oxygen, can occur into the port from the ambient atmosphere. A stream of purging agent, such as nitrogen, at a low or high pressure, preferably at ambient pressure, is applied to the extruder. This gas may be applied at ambient conditions or preferably heated to prevent cooling of the contacted polyester. The extruder may be operated in such a fashion to allow concurrent or countercurrent flow of gas along with the polyester being conveyed in unfilled extruder screw flights. Alternately, purge agent sweep can be applied to single or multiple ports, depending on the level of acetaldehyde removal required for a particular application. Extruder ports may be configured as open sections of the extruder barrel, or as open holes in the extruder barrel. Purge agent can be introduced to the port at a single point via a tube or pipe, or dispersed throughout the port by several tubes or pipes, or some other large area distribution system, such as a fritted plate or device with several outlets. Purge agent may be introduced in the void above the extruder screws or subsurface to the molten polymer. The ports may be operated at ambient, reduced, or high pressure.

After passing through one or more venting zones, the polyester is normally conveyed out of the extruder by a screw compression zone, as is known in the art. This zone compresses the polymer melt so that the screw channels are filled and any gas bubbles left from the gas sweep venting are excluded. It is important that this degassing is complete,. so that bubbles are not formed in the shaped or molded rods or articles formed from the process. It is also important that the polymer reside in this zone at the lowest temperature and shortest time possible, otherwise, more acetaldehyde will form in the molten polyester and negate the effects of the inert gas sweep ventilation. The time and temperature will be dependent on the character of the polyester, additives to the polyester, the type of screw extruder used, and the operational variables of the extruder, but should typically be less than 300° C. and 15 minutes and preferably be less than 270° C. and 5 minutes for the manufacture of low acetaldehyde packaging products. The time spent between devolatilization and shaping the final article must also be kept low in order to avoid excessive acetaldehyde generation. The final step of this process is to convey the polymer to another process which can form rods, tubes, pellets or some other shaped or molded article of manufacture.

The degree of polymerization and therefore the I.V. of the final article will be dependent on the initial I.V. of the polymer fed to the extruder, the amount of water present in the polyester feed, and the contact time and amount of inert gas sweep. Since the polyester is fed in the molten state, the I.V. can be preserved or raised, depending on the contact time, temperature and flow rate of the inert gas sweep.

The term "I.V." used herein refers to the Inherent Viscosity of the polymer, as determined by standard methods on a solution of 0.5 g of polymer dissolved in 100 mL of a mixture of phenol (60% by volume) and tetrachloroethane (40% by volume).

Acetaldehyde concentration in polyesters is measured as follows:

Extruded polyester samples are collected into dry ice to quench the melt. The polymer is then immediately chopped into granules and approximately 6 g is placed into vials with rubber lined caps. Vials are stored at −40° C. for no longer than three days before analysis. The samples are then ground in a Wiley mill to pass a 20 mesh screen and placed in gas chromatography desorption tubes. The acetaldehyde is desorbed from the polymer at 150° C. for 10 minutes and quantified by gas chromatography.

EXAMPLES 1 TO 9

Poly(ethylene terephthalate) is synthesized according to the art to approximately 0.64 dL/g I.V. from dimethyl terephthalate and ethylene glycol with 3.5 mole percent 1,4-cyclohexanedimethanol. The polymer is granulated, fed to a vented twin screw extruder, melted at 265° C. and metered into the vented section of the extruder. The temperature of the extruder venting zone is varied in this example. The temperature between the vent and discharge port is controlled at 260° C. For gas sweep examples, a gas inlet system heated at 285° C. is placed in the extruder vent. Nitrogen flow is controlled at 35 scfh by a rotometer and vented to atmospheric pressure through a bubble trap. For vacuum work, a vacuum pump is connected to the vent and the vacuum pressure lowered to below 0.5 torr. Control experiments are performed by totally blocking the extruder vent. Table 1 compares the measured acetaldehyde content in the collected polymer as a function of temperature and residence time after the melt ventilation zone for unvented, vacuum vented, and nitrogen sweep vented extrusion of poly(ethylene terephthalate).

TABLE 1

| Example | Temperature (deg C.) | Residence Time after Melt Venting (min) | Acetaldehyde (Control no melt venting) (ppm) | Acetaldehyde (Vacuum venting at 0.5 torr) (ppm) | Acetaldehyde (Gas Sweep 35 scfh nitrogen) (ppm) |
|---|---|---|---|---|---|
| 1 | 270 | 3 | 16 | 8.0 | 5.6 |
| 2 | 270 | 6 | 23 | 9.0 | 6.8 |
| 3 | 270 | 9 | 25 | 12 | 9.6 |
| 4 | 280 | 3 | 25 | 10 | 7.9 |
| 5 | 280 | 6 | 31 | 13 | 10 |
| 6 | 280 | 9 | 39 | 17 | 12 |
| 7 | 290 | 3 | 30 | 16 | 10 |
| 8 | 290 | 6 | 47 | 21 | 14 |
| 9 | 290 | 9 | 62 | 26 | 15 |

EXAMPLE 10

Poly(ethylene terephthalate) is synthesized according to the art to approximately 0.60 dL/g I.V. from dimethyl terephthalate and ethylene glycol with 3.5 mole percent 1,4-cyclohexanedimethanol. The polymer is granulated, fed to a vented twin screw extruder, melted at 265° C., and metered into the vented section of the extruder. The temperature of the extruder venting zone is 280° C. The temperature between the vent and discharge port is controlled at 260° C. A gas inlet system heated at 285° C. is placed in the extruder vent and a 35 scfh nitrogen flow is established using a rotometer. Nitrogen is vented to atmospheric pressure through a bubble trap. The residence time from the vent to the discharge is 6 minutes. Poly(ethylene terephthalate) is collected and the measured acetaldehyde content is 13 ppm. The extruder die is then removed to reduce the residence time between the vent and discharge port. Poly(ethylene terephthalate) is collected from the end of the extruder screws while the extruder is being operated. The acetaldehyde content is measured to be 4.6 ppm.

EXAMPLES 11 TO 19

Poly(ethylene terephthalate) is synthesized according to the art to approximately 0.60 dL/g I.V. from dimethyl terephthalate and ethylene glycol with 3.5 mole percent 1,4-cyclohexanedimethanol. The polymer is granulated, fed to a different vented twin screw extruder, melted at 265° C., and metered into the vented section of the extruder. The temperature of the extruder venting zone is varied in these examples. The temperature between the vent and discharge port is controlled at 260° C. For gas sweep examples, a gas inlet system heated at 285° C. is placed in the extruder vent. Nitrogen flow is controlled at 35 scfh by a rotometer and vented to atmospheric pressure through a bubble trap. For vacuum work, a vacuum pump is connected to the vent and the vacuum pressure lowered to below 0.5 torr. Table 2 compares the measured acetaldehyde content in the collected polymer as a function of temperature and residence time after the melt ventilation zone for vacuum vented and nitrogen sweep vented extrusion of poly(ethylene terephthalate).

TABLE 2

| Example | Temperature (deg C.) | Residence Time after Melt Venting (min) | Acetaldehyde (Vacuum venting at 0.5 torr) (ppm) | Acetaldehyde (Gas Sweep 35 scfh nitrogen) (ppm) |
|---|---|---|---|---|
| 11 | 270 | 4.6 | 6.1 | 7.4 |
| 12 | 270 | 3.0 | 6.0 | 7.0 |
| 13 | 270 | 6.0 | 9.0 | 10 |
| 14 | 280 | 2.4 | 8.7 | 8.8 |
| 15 | 280 | 4.6 | 11 | 11 |
| 16 | 280 | 6.6 | 13 | 15 |
| 17 | 290 | 3.0 | 12 | 14 |
| 18 | 290 | 6.0 | 19 | 20 |
| 19 | 290 | 4.6 | 18 | 19 |

EXAMPLES 20 TO 24

Poly(ethylene terephthalate) is synthesized according to the art to approximately 0.59 dL/g I.V. from terephthalic acid and ethylene glycol with 1.5 mole percent 1,4-cyclohexanedimethanol. The polymer is granulated, fed to a vented twin screw extruder, melted at 265° C., and metered into the vented section of the extruder. The temperature of the extruder venting zone is varied in these examples. The temperature between the vent and discharge port is controlled at 260° C. Nitrogen sweep at 35 scfh is established through a gas inlet system heated at 285° C. and placed in the extruder vent. Nitrogen is vented to atmospheric pressure through a bubble trap. Table 3 shows the measured acetaldehyde content and I.V. for the collected polymer as a function of temperature and residence time after the melt ventilation zone.

TABLE 3

| Example | Temperature (deg C.) | Residence Time after Melt Venting (min) | Acetaldehyde (ppm) | Inherent Viscosity (dL/g) |
|---|---|---|---|---|
| 20 | 265 | 1 | 2.9 | 0.62 |
| 21 | 265 | 3 | 4.7 | 0.63 |
| 22 | 272.5 | 2 | 5.2 | 0.62 |
| 23 | 280 | 1 | 4.3 | 0.61 |
| 24 | 280 | 3 | 7.5 | 0.64 |

EXAMPLES 25 TO 34

Poly(ethylene terephthalate) is synthesized according to the art to approximately 0.77 dL/g I.V. from terephthalic acid and ethylene glycol with 1.5 mole percent 1,4-cyclohexanedimethanol. The polymer is granulated and some samples are placed in a sealed container with liquid acetaldehyde (boiling point 21° C.) to raise the polymer free acetaldehyde level. After 24 hours or more equilibration time, the polymer is fed to a vented twin screw extruder, melted at 265° C., and metered into the vented section of the extruder. The temperature of the extruder venting zone is varied in these examples. The temperature between the vent and discharge port is controlled at 260° C. Nitrogen sweep at 35 scfh is established through a gas inlet system heated at 285° C. and placed in the extruder vent and vented to atmospheric pressure through a bubble trap. Table 4 shows the measured acetaldehyde content and I.V. for the collected polymer as a function of temperature, residence time after the melt ventilation zone, and initial acetaldehyde content of the granulated poly(ethylene terephthalate).

TABLE 4

| Example | Precursor Acetaldehyde content (ppm) | Temperature (deg C.) | Residence Time after Melt Venting (min) | Acetaldehyde (ppm) | Inherent Viscosity (dL/g) |
|---|---|---|---|---|---|
| 25 | 0.3 | 265 | 1 | 2.3 | 0.73 |
| 26 | 0.3 | 265 | 3 | 2.9 | 0.77 |
| 27 | 0.3 | 273 | 2 | 3.7 | 0.76 |
| 28 | 0.3 | 280 | 1 | 1.9 | 0.74 |
| 29 | 0.3 | 280 | 3 | 9.1 | 0.78 |
| 30 | 200 | 265 | 1 | 3.4 | 0.72 |
| 31 | 200 | 265 | 3 | 3.2 | 0.75 |
| 32 | 200 | 273 | 2 | 3.4 | 0.73 |
| 33 | 200 | 280 | 1 | 3.9 | 0.72 |
| 34 | 200 | 280 | 3 | 6.0 | 0.77 |

EXAMPLES 35 TO 45

Poly(ethylene terephthalate) is synthesized according to the art to approximately 0.60 dL/g I.V. from terephthalic acid and ethylene glycol with 1.5 mole percent 1,4-cyclohexanedimethanol. The polymer is granulated, fed to a vented twin screw extruder, melted at 265° C., and metered into the vented section of the extruder. The temperature of the extruder venting zone is 280° C. The temperature between the vent and discharge port is controlled at 260° C. For gas sweep examples, a gas inlet system heated at 285° C. is placed in the extruder vent. Nitrogen flow is controlled at 20 scfh by a rotometer and vented to atmospheric pressure through a bubble trap. Lower nitrogen flows are controlled by a mass flow controller. For vacuum work, a vacuum pump is connected to the vent and the vacuum pressure lowered. Table 5 compares the measured acetaldehyde content in the collected polymer as a function of vacuum venting level and nitrogen sweep rate for vented extrusion of poly(ethylene terephthalate), after approximately 5 minutes of melt residence time after ventilation.

TABLE 5

| Example | Vent Pressure (torr) | Gas Sweep Rate (scfh) | Acetaldehyde (ppm) | Inherent Viscosity (dL/g) |
|---|---|---|---|---|
| 35 | ambient | 0 | 20 | 0.58 |
| 36 | ambient | 0.07 | 12 | 0.60 |

TABLE 5-continued

| Example | Vent Pressure (torr) | Gas Sweep Rate (scfh) | Acetaldehyde (ppm) | Inherent Viscosity (dL/g) |
|---|---|---|---|---|
| 37 | ambient | 0.14 | 11 | 0.60 |
| 38 | ambient | 0.21 | 12 | 0.61 |
| 39 | ambient | 0.53 | 10 | 0.62 |
| 40 | ambient | 1.06 | 11 | 0.62 |
| 41 | ambient | 20 | 12 | 0.67 |
| 42 | 0.5 | 0 | 9.4 | 0.67 |
| 43 | 3 | 0.21 | 9.3 | 0.67 |
| 44 | 5 | 0.53 | 10 | 0.67 |
| 45 | 7 | 1.06 | 9.4 | 0.67 |

EXAMPLES 46 TO 55 (COMPARATIVE)

Poly(ethylene terephthalate) is synthesized according to the art to approximately 0.77 dL/g I.V. from terephthalic acid and ethylene glycol with 1.5 mole percent 1,4-cyclohexanedimethanol. The polymer is granulated and sealed in a container with liquid acetaldehyde (boiling point 21° C.) to raise the free acetaldehyde content of the polymer to the desired level. After 24 hours or more equilibration time, the polymer is fed to a vented twin screw extruder, melted at 265° C., and metered into the vented section of the extruder. The total residence time of the polymer in the extruder is approximately 10 minutes. The temperature of the extruder venting zone is varied in these examples. The temperature between the vent and discharge port is controlled at 260° C. The residence time of the polymer between the vent and the discharge port is approximately 2 minutes. A vacuum pump system is connected to the extruder vent and vacuum pressure is varied by a nitrogen bleed valve upstream of the extruder. Table 6 shows the measured acetaldehyde content and I.V. for the collected poly(ethylene terephthalate) as a function of temperature and vacuum pressure.

TABLE 6

| Example | Initial Acetaldehyde (ppm) | Temperature (deg C.) | Vacuum Pressure (torr) | Acetaldehyde (ppm) | Inherent Viscosity (dL/g) |
|---|---|---|---|---|---|
| 46 | 200 | 265 | 0.5 | 3.5 | 0.74 |
| 47 | 200 | 265 | 350 | 48 | 0.69 |
| 48 | 200 | 273 | 175 | 60 | 0.68 |
| 49 | 200 | 280 | 0.5 | 5.4 | 0.72 |
| 50 | 200 | 280 | 350 | 64 | 0.67 |
| 51 | 160 | 273 | 175 | 65 | 0.67 |
| 52 | 160 | 273 | 44 | 30 | 0.69 |
| 53 | 160 | 273 | 10 | 11 | 0.71 |
| 54 | 160 | 273 | 5 | 5.8 | 0.72 |
| 55 | 160 | 273 | 1.1 | 4.3 | 0.75 |

EXAMPLES 56 TO 67

Poly(ethylene terephthalate) is synthesized according to the art to approximately 0.77 dL/g I.V. from terephthalic acid and ethylene glycol with 1.5 mole percent 1,4-cyclohexanedimethanol. The polymer is granulated and placed in a sealed container with liquid acetaldehyde (boiling point 21° C.) to raise the free acetaldehyde content of the polymer. After 24 hours or more equilibration time, the polymer is fed to a twin screw extruder, melted at 265° C., and metered into the vented section of the extruder. The total residence time of the polymer in the extruder is approximately 10 minutes. The temperature of the extruder venting zone is varied in these examples. The temperature between the vent and discharge port is controlled at 260° C. The residence time of the polymer between the vent and the discharge port is approximately 2 minutes. A gas inlet system heated at 285° C. is placed in the extruder vent. Nitrogen flow is varied by a mass flow controller and vented to atmospheric pressure through a bubble trap. Table 7 shows the measured acetaldehyde content and I.V. for the collected poly(ethylene terephthalate) as a function of temperature and gas flow rate.

TABLE 7

| Example | Initial Acetaldehyde (ppm) | Temperature (deg C.) | Gas Sweep Rate (scfh) | Acetaldehyde (ppm) | Inherent Viscosity (dL/g) |
|---|---|---|---|---|---|
| 56 | 200 | 280 | 0 | 44 | 0.65 |
| 57 | 200 | 265 | 0.03 | 22 | 0.67 |
| 58 | 200 | 265 | 0.93 | 2.5 | 0.72 |
| 59 | 200 | 273 | 0.48 | 4 | 0.71 |
| 60 | 200 | 280 | 0.03 | 26 | 0.67 |
| 61 | 200 | 280 | 0.93 | 5.1 | 0.72 |
| 62 | 160 | 273 | 0 | 42 | 0.66 |
| 63 | 160 | 273 | 0.032 | 29 | 0.68 |
| 64 | 160 | 273 | 0.14 | 9.3 | 0.69 |
| 65 | 160 | 273 | 0.25 | 5.1 | 0.70 |
| 66 | 160 | 273 | 0.48 | 3.4 | 0.70 |
| 67 | 160 | 273 | 0.93 | 3.1 | 0.71 |

Unless otherwise specified, all parts, percentages, ratios, etc., are by weight.

I.V. as used herein is inherent viscosity measured at 25° C. using 0.50 gram polymer per 100 mL of a solvent consisting of 60% by weight phenol and 40% by weight tetrachloroethane.

The invention has been described in detail with particular reference to preferred embodiments thereof, but it will be understood that variations and modifications can be effected within the spirit and scope of the invention.

We claim:

1. A process for removing acetaldehyde from polyester derived from components comprising at least one dicarboxylic acid and at least one glycol which comprises the steps of
   a) transporting molten polyester to a vented, continuous screw conveyor having a polymer compression zone,
   b) rotating the screw of said conveyor so as to compress and convey through the extruder the molten polymer for a time of less than 15 minutes and at a temperature of less than 300° C.,
   c) simultaneously with step b), flowing a purge agent into and out of said extruder to thereby remove volatile impurities from said molten polyester and avoid appreciable build-up of acetaldehyde, and
   d) conveying the devolatized polymer melt to a forming device wherein an article of manufacture is formed.

2. Process according to claim 1 wherein the polyester from step a) has an I.V. of about 0.50–0.85.

3. Process according to claim 1 wherein the conveyer in step b) is an extruder.

4. Process according to claim 1 wherein the polyester has a final residual acetaldehyde content of less than <15 ppm.

5. Process according to claim 1 wherein at least 80 mol % said dicarboxylic acid is terephthalic acid.

6. Process according to claim 1 wherein at least 80 mol % of said glycol is ethylene glycol.

7. Process according to claim 1 wherein said glycol is a mixture of ethylene glycol and cyclohexane-dimethanol.

8. Process according to claim 1 wherein said acid is terephthalic acid and said glycol is a mixture of about 60–99 mol % ethylene glycol and about 40–1 mol % cyclohexanedimethanol.

9. Shaped, extruded or molded polymeric articles having low acetaldehyde content produced by the process of claim 1.

10. Process of claim 1 where the temperature of the polymer in the devolatilization zone is held at 5° to 50° C. above the melting point of said polyester.

11. Process of claim 1 where the polymer is devolatilized for 5 to 600 seconds.

12. Process of claim 1 where the polymer spends from 0.1 to 15 minutes in the melt after devolatilization.

13. Process of claim 1 where the inherent viscosity of the resultant polymer is 0.55 to 0.95.

* * * * *